US 6,629,872 B2

(12) United States Patent
Cheung

(10) Patent No.: US 6,629,872 B2
(45) Date of Patent: Oct. 7, 2003

(54) METHOD FOR MANUFACTURING A PET MANNEQUIN FOR TRAINING PET TRIMMING TECHNICIANS

(76) Inventor: Jeremy Chi Kong Cheung, Flat, 12F, Block 4, Beacon Height 4 Lung Ping Road, Kowloon, Hong Kong (CN)

( * ) Notice: Subject to any disclaimer, the term of this patent is extended or adjusted under 35 U.S.C. 154(b) by 0 days.

(21) Appl. No.: 10/253,124

(22) Filed: Sep. 24, 2002

(65) Prior Publication Data

US 2003/0068956 A1 Apr. 10, 2003

(30) Foreign Application Priority Data

Oct. 4, 2001 (JP) .................................. PCT/JP01/08748

(51) Int. Cl.[7] ................................................. A63H 3/36
(52) U.S. Cl. ...................... 446/385; 446/394; 446/369; 434/295
(58) Field of Search ................................ 446/385, 394, 446/372, 369; 434/295, 296

(56) References Cited

U.S. PATENT DOCUMENTS

| | | | | |
|---|---|---|---|---|
| 1,620,340 A | * | 3/1927 | Freudenberg | 139/427 |
| 1,630,165 A | * | 5/1927 | Butler | 446/369 |
| 2,968,104 A | * | 1/1961 | Ito | 446/394 |
| 3,003,155 A | * | 10/1961 | Mielzynski et al. | 446/394 |
| 4,908,001 A | * | 3/1990 | Kopian | 446/385 |
| 5,129,853 A | * | 7/1992 | Bowling | 446/372 |
| 5,738,559 A | * | 4/1998 | Ostrar | 446/100 |
| 5,824,378 A | * | 10/1998 | Armendariz et al. | 428/7 |
| 6,176,756 B1 | * | 1/2001 | Panec | 446/99 |
| 6,220,922 B1 | * | 4/2001 | Lee et al. | 446/385 |

FOREIGN PATENT DOCUMENTS

| | | | | |
|---|---|---|---|---|
| DE | 3905273 A1 | * | 8/1990 | A63H/3/44 |
| JP | 07313736 A | * | 12/1995 | A63H/3/02 |
| JP | 2000214763 A | * | 8/2000 | G09B/19/24 |

OTHER PUBLICATIONS

Rescue Critters, Animal Training Mannikins, Internet—http://rescuecritters.com/prices.html, 2003.*
Petmann, Dog Mannequin, Internet—http://www.petmann.com, 2003.*

* cited by examiner

*Primary Examiner*—Derris H. Banks
*Assistant Examiner*—Urszula M Cegielnik
(74) *Attorney, Agent, or Firm*—Sidney N. Fox

(57) ABSTRACT

The invention provides a method for manufacturing a pet model, commonly referred to as a pet mannequin, here a dog mannequin, is implanted on a soft walled hollow molded dog body formed of a polyvinyl chloride molding solution, the soft walled hollow molded dog body including a torso, trunk and leg portions, the molded body and a head portion and a pair of ears are molded separately. The molded body and head portions are filled with a chaff packing. Precut lengths of hair-simulating wool yarn are implanted into the wall of the molded body using a crochet needle. Thereafter, the chaff packing is removed from the implanted body and head portions. Next, a hot charge of pre-mixed self-expansible liquid polyvinyl chloride resin and polymeric isocyanate foaming bubble solution is introduced into the implanted body and head portions and permitted to cool, fixing the implanted lengths of hair-simulating wool permanently from the inside the body and head portions, thereby hardening the body and head portions, leaving exterior portions of said lengths. The body and head portions are coupled together. The exterior wool yarn lengths are brushed to form a mass of soft longitudinal filaments constituting the dog mannequin as a practice vehicle for use by pet grooming trimmers shaping the dog form by shearing.

14 Claims, 4 Drawing Sheets

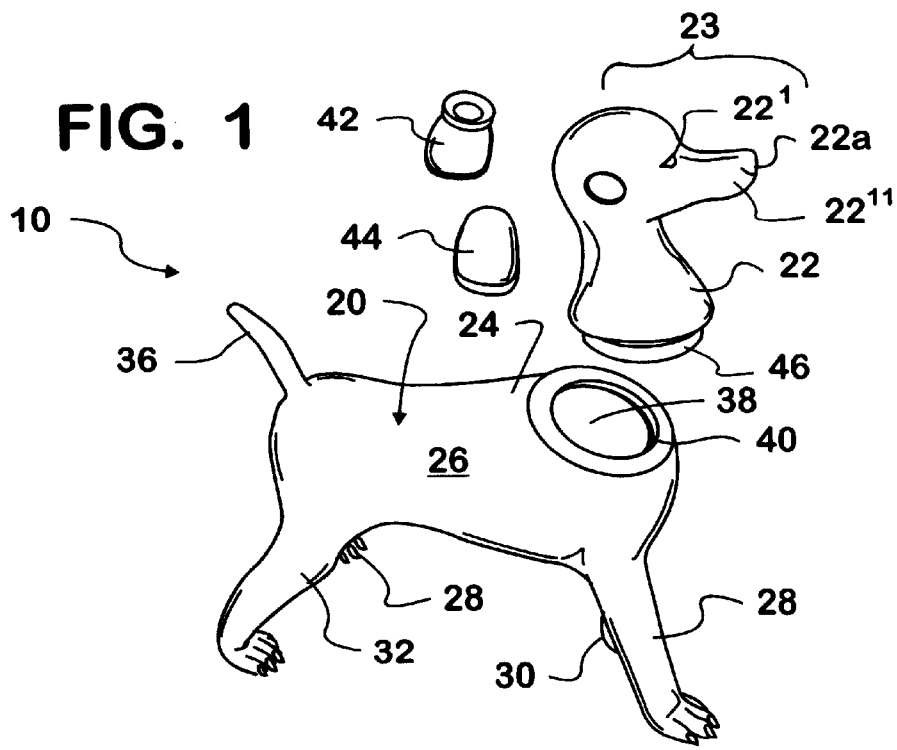
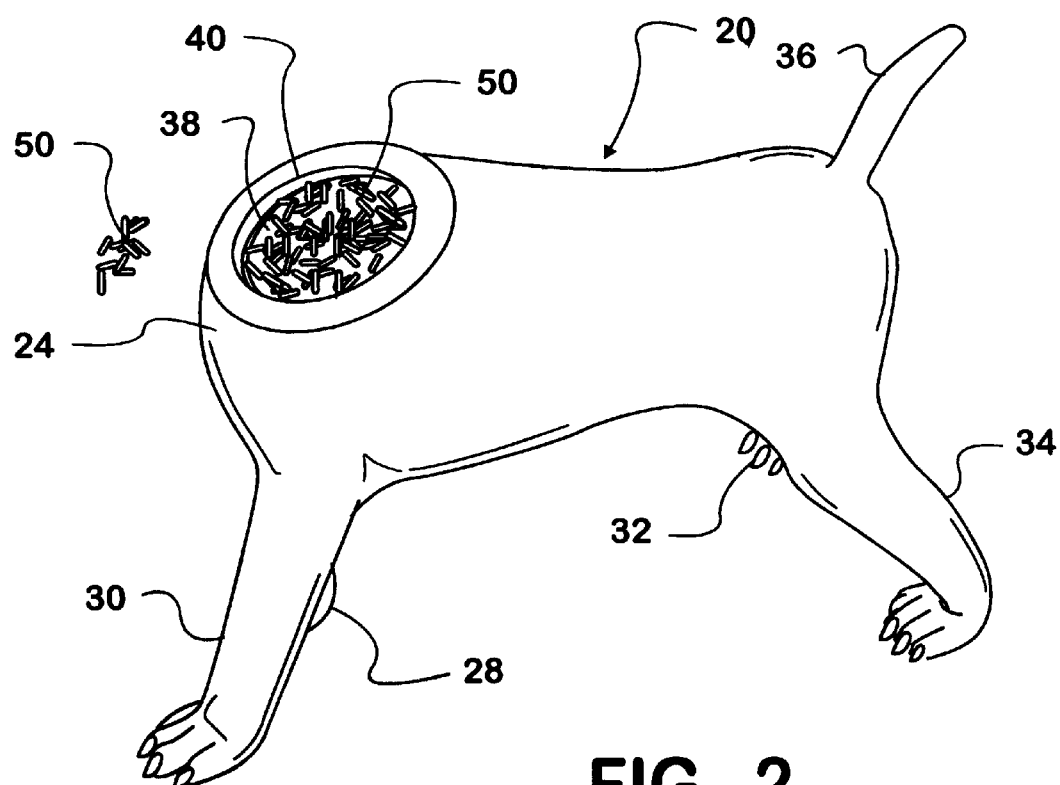

FIG. 7
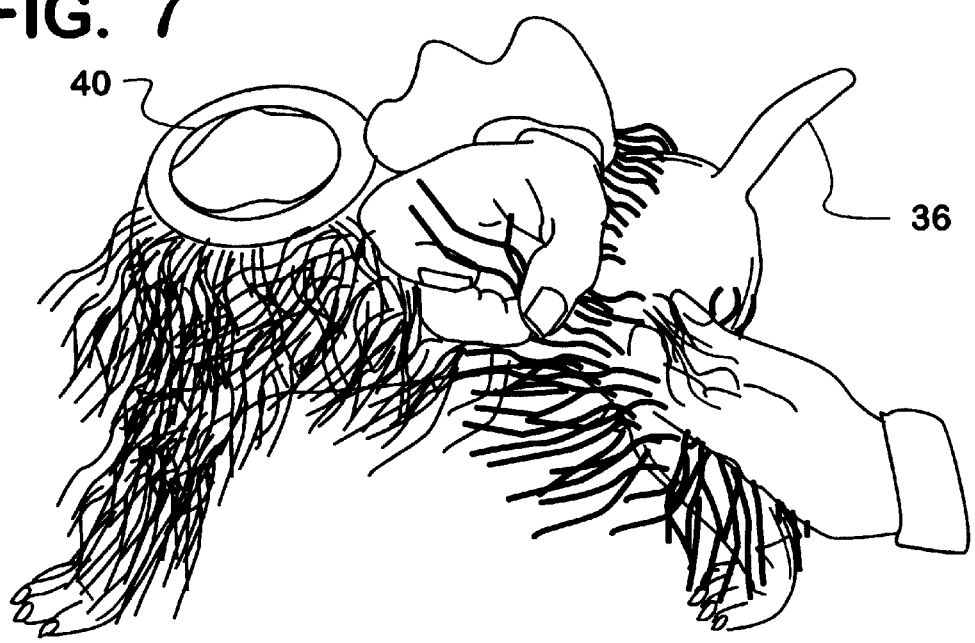
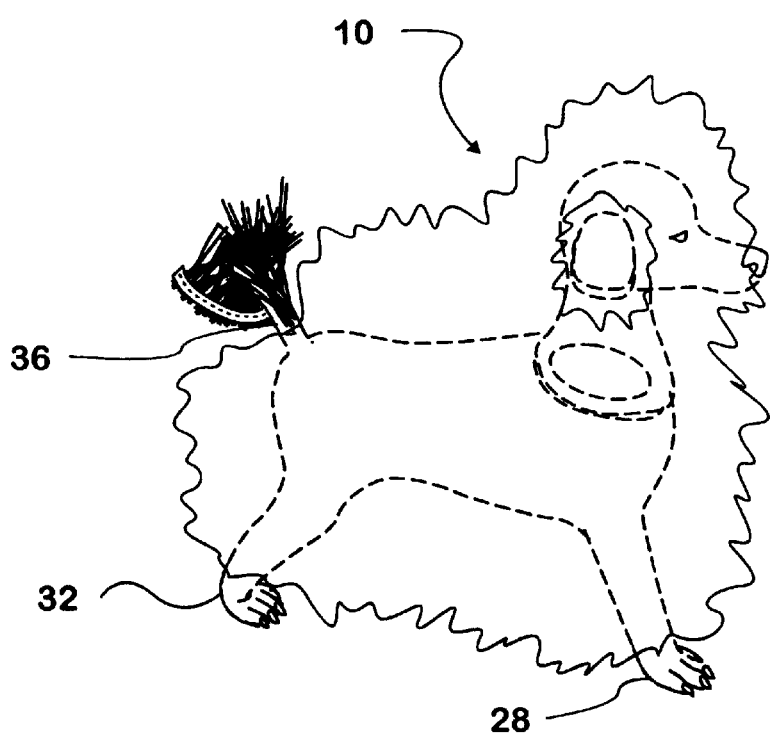
FIG. 8

METHOD FOR MANUFACTURING A PET MANNEQUIN FOR TRAINING PET TRIMMING TECHNICIANS

FIELD OF THE INVENTION

The instant invention relates generally to a method for manufacturing a pet model commonly known as a stand alone pet mannequin, for use in the training of technicians known as trimmers, in the art of trimming the hair coats of pets, such as dogs, and provides teaching, training and practice in the trimming art and technique for grooming pet animals such as dogs, for example.

BACKGROUND OF THE INVENTION

An important process in the art and practice of grooming animals, such as a dog, for example, conventionally is performed by "experts" known as "trimmers", skilled in the art of arranging, cutting and shaping the "hairs or outer "fur" of the animal's exterior coats particularly for display at varied and often prestigious pet shows at which dogs are shown in contested performances. The professional "trimmer" undergoes extensive training in the trimming art involving much practice upon models manufactured for the purpose of affording the opportunity to learn and practice the art of trimming or shaping the "hair coat" of pet animals. Accordingly, a substantial course of study is required for the training of individuals in the art of grooming pet animals, particularly the various dog species popularly featured in special competitive shows or displays. The use of living animals is prohibitive in cost and in the number required to supply each of the plurality of students. Therefore, a plurality of models must be supplied both for demonstration and to afford each student with at least one upon which to learn the techniques and practice following the grooming steps involved. Suitable models must be manufactured at a reasonable cost to supply the needs of each of the students. Techniques can be illustrated pictorially in step by step charts and drawings, but considerable "hands on" practice is required for each student to acquire proficiency in the trimming and grooming art. Adequate pet models are necessary but not available.

Conventional pet models, commonly referred to as "animal mannequins" were manufactured by forming a pseudo-animal body which can be provided with a "coat" of hair by implanting "pseudo-animal hair" into a solid rigid replica of an animal's body formed of wood or synthetic resin, respectively absent actual body hair. This process involved the application of excessive force to drive the generally rigid hair-like pseudo-hair into the solid pseudo-replica body until the pseudo-replica body was covered with a mass of such generally rigid forcibly implanted pseudo-hair over a substantial portion of the pseudo-replica animal's body. The result was an unrealistic model which was difficult to trim to the desired shape and offered a highly unrealistic result.

Another conventional pet model provided for the purpose of educating a trainee in the art of such pet grooming techniques was manufactured by forming a replica model of hard plastic or wooden material and applying pseudo-animal hair thereon by pasting same directly onto a flexible sheet material and forming the resulting coated sheet into a wearable "coat" which would be draped over the replica animal model, fitted to said model replica animal's body and applied thereto. The resulting fitted "wearable hair coat" would be relative flat or thin, hardly a massive body of pseudo-hair which can afford the exercise of trimming (or reducing) the volume of pseudo-hair to be operated upon by the trimmer in training to reduce such volume so as to simulate the natural, precisely shaped, "hair coat" simulative of the natural "hair coat" covering of an actual living animal. The purpose of the pseudo hair was to enable a "shearing" process to be conducted, shearing being the necessary trimming process to be carried out.

The model that is required for the training of specialists as professional animal groomers known as trimmers, who are skilled in the art of shaping the "body hair" of animal pets, must be formed as a hard body of rigid material such as plastic or wood, carrying a mass of flocked simulative body hair consisting of a large quantity fine, soft "silk-like" individual threads permanently adhered thereto, the flocked simulative body hair must be capable not only of being sheared but also must be capable of being brushed, combed, precisely cut and capable of manual directional manipulations involved in the trimming procedure. The conventional implanted hair has not been capable of being combed and brushed to effect the desired softness should result from the steps of brushing, combing, cutting and performing the manual directional manipulations involved in the trimming procedure.

SUMMARY OF THE INVENTION

The invention provides a method of manufacturing a pet model, conventionally described as a pet mannequin, for teaching and practicing the art of trimming the hairy coat of the pet animal, particularly a dog. The method comprises the steps separately molding a polyvinylchloride soft hollow dog body often referred to as a "rubber dog" and a soft molded head having means for mounting a pair of separately molded soft molded ears thereto; filling the "rubber dog" and head with chaff, such as seed coverings and other debris separated from threshing grain, such as the seed covers of rice, barley, buckwheat, and even whole rice; manually implanting plural selected lengths of wool yarn closely spaced into the soft wall of the chaff filled "rubber dog" and head using a hooked crochet needle; emptying the chaff from the interior of the "rubber dog" and head, leaving the implanted wool yarn lengths therein; injecting a charge of a pre-mixed self-expansible adhesive resin solution into the "rubber dog" and head; permitting the self-expansion of the injected adhesive resin solution to effect the permanent adherence of the wool yarn interior of the "rubber dog" and head; coupling the "rubber dog" and head and permitting same to self-harden with the implanted wool lengths secured interior thereof, and thereafter separating by tearing the exterior wool lengths into thin, soft single lengths thereby to complete the dog mannequin. The term "flocking" is often employed by skilled artisans in the field of pet grooming to describe the process of implanting animal hair into the body of pet models, also referred to as pet mannequins.

BRIEF DESCRIPTION OF THE DRAWINGS

FIG. 1 is an exploded view of the hairless molded soft-bodied "rubber dog" intermediate dog mannequin according to the invention before application of the hair-simulating media;

FIG. 2 is an enlarged representation of the soft-bodied "rubber dog" intermediate dog mannequin shown after the addition of chaff-filler into the "rubber dog";

FIG. 7 is an illustration of the manual tearing separation of the exterior disposed strands of wool yarn, into individual thin, fine strands after the implantation process has been completed, subsequent to the expansion of the injected pre-mixed self-expansible adhesive solution within the "rubber-dog" body and the resulting hardening of said "rubber-dog" body; and, FIG. 8 is an illustration of the completed dog mannequin shown subsequent to assembly of the separately molded head and ears thereto shown in phantom representation subsequent to implantation of the hair-simulating wool yarn and tearing thereof into individual thin fine strands, thereafter, the wool yarn lengths having been brushed into fine silk-like lengths and, the application of the hair-simulating torn wool yarn to the tail portion of the dog mannequin by sewing said tail portion to a cloth segment and sewing the result to the tail portion of the "rubber-dog" body.

DESCRIPTION OF A PREFERRED EMBODIMENT OF THE INVENTION

Figure 3:
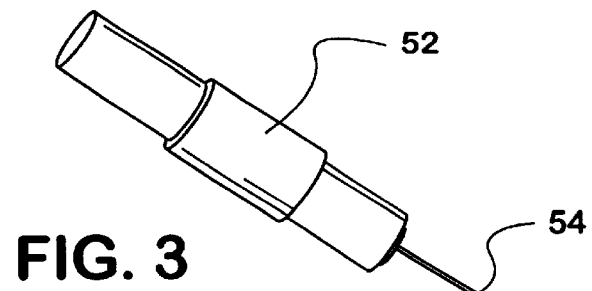
FIG. 3 is an illustration of the crochet needle employed in the manual implantation of hair-simulating woolen yarn into the chaff-filled soft "rubber dog"
Figure 4:
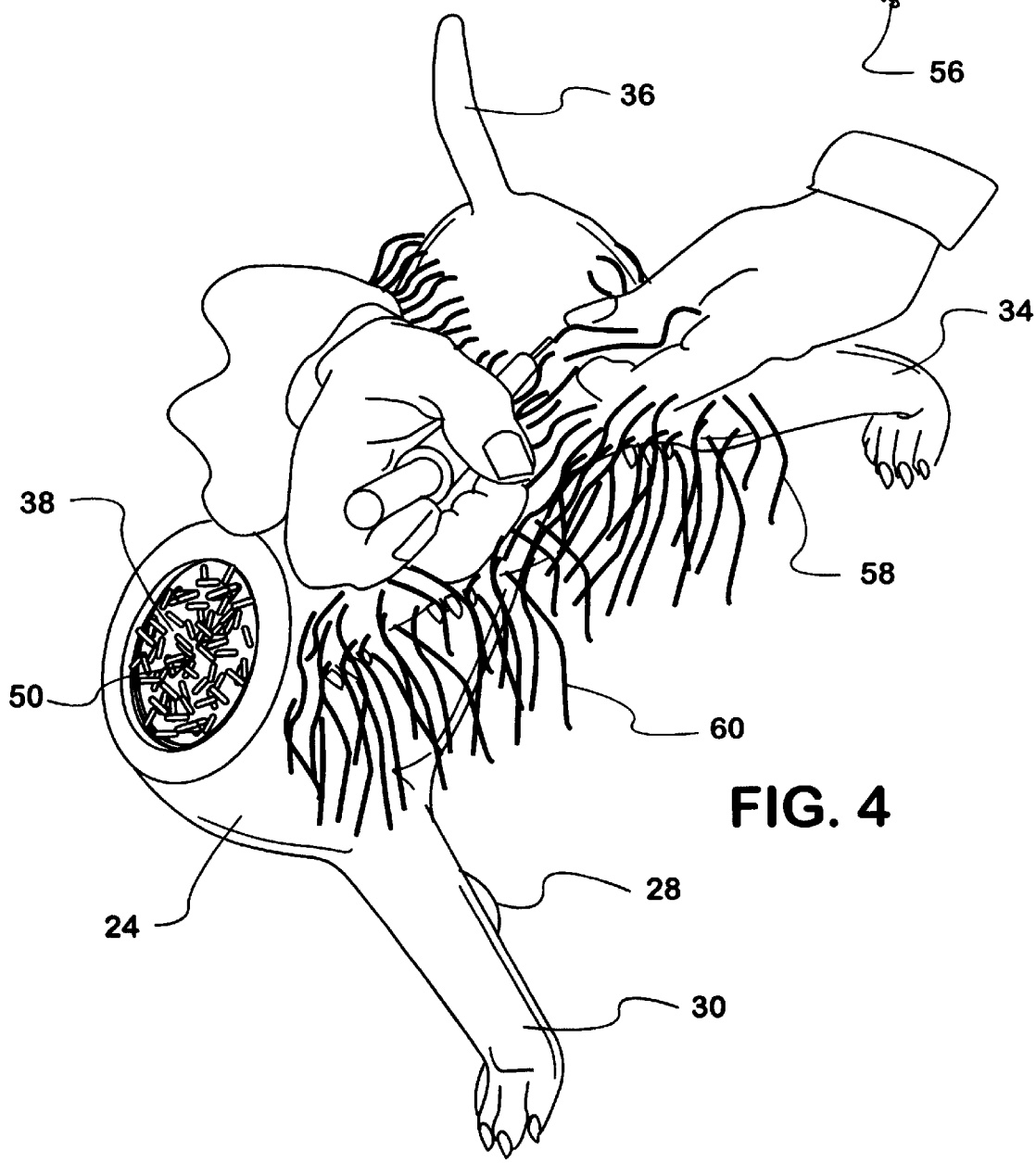
FIG. 4 is an illustration of the manual implantation of the hair-simulating wool yarn strands into the chaff-filled soft "rubber dog" employing the crochet needle illustrated in FIG. 3.

The invention provides a method for manufacturing a pet animal model, commonly referred to as a pet mannequin for use in the teaching and training of individuals as highly skilled professional trimmers who arrange the shape of pets such as dogs, for example, by trimming the hair of the pet animal's natural hair coat. Considerable interest has been raised in the grooming of pet animals particularly for contested demonstrations such as dog shows, each species of dogs having characteristic preferred shapes of their hair coats that have become characteristic of quality grooming. Schools have been organized for the purpose of teaching and training the art of grooming pet animals, such as dogs, by shearing the hair coats of pet animals such as dogs by shearing and trimming the hair from the dog's hair-coat to result in a desired appearance. For that purpose, it has become necessary to provide those trainees with a pet model since living animals most often are not available for such teaching and training purposes. Prior to the availability of manufactured pet models, instruction in the art of trimming relied upon paper drawings and diagrams for affording instructions in the art of trimming. Hands on instructions and training were dependent upon demonstrations on living animals or upon physical models which were manufactured by providing solid animal replicas having hair or hair-simulating compositions forcibly implanted into the hard surface of solid models formed of wood or plastic by applying hair simulating material forcibly applied to the surface of such wood or plastic animal reproductions or by pasting hair or hair simulating materials, waste hair, or pseudo hair directly upon or into such wood or plastic animal replica by forcibly driving hair into the wood or plastic animal replica or reproductions or pasting such hair or hair simulating materials, waste hair or pseudo-hair upon the surface of such wood or plastic animal replica.

Referring now to the drawings, FIG. 1 illustrates the soft hollow body 20 which will be referred to hereinafter as the soft, hollow "rubber dog" 20 and the soft, hollow head 22. Separate molds (not shown) formed of iron metal are employed for the formation of the soft, hollow "rubber dog" 20 and the soft head 22 of the dog mannequin 10. The soft "rubber dog" 20 includes the torso 24, the trunk 26, the four legs 28, 30, 32, 34 and the tail 36. The torso 24 is formed with an entry opening 38 having rim means 40 for coupling the head 22 thereto. The head 22 also includes rim means 46 unitary therewith coupling the head 22 to the "rubber dog" 20. A pair of ears 42,44 are formed separately, in individual molds (not shown) or alternately, in a single double-cavity mold (not shown). Each of the ears 42, 44 are provided with coupling means 48 for joining the ears 42,44 to the head 22. Other metals such as copper, for example, can be utilized to form the respective molds for the hollow soft "rubber dog" 20 and the soft head 22.

One example of a molding solution can be prepared of 49.9% polyvinyl chloride resin using 199.2 grams, 41.8% of an oil, such as DOP oil using 167.1 grams, 4.2% of a heat resistance solution using 16.8 grams, 2.1% of EC stabilizing solution using 8.4 grams and CZ stabilizing solution using 8.4 grams. The molding solution is injected into the respective mold for the soft hollow "rubber dog" 20, and the mold for the soft hollow head 22. The two molds (not shown) are mounted on a revolving tray (not shown) disposed within a heater box (not shown) and are heated for 8 minutes at a temperature of 270 to 300 degrees Fahrenheit for about 8 minutes, the molding solution solidifying within the molds. The rotating tray and molds are withdrawn from the furnace box (not shown) and submerged into a cooling water tank (not shown) for a time period of about 3 minutes and lifted out of the cooling tank (not shown). The molds respectively are opened and the soft "rubber dog" 20, comprising the torso, 24, the trunk 26, and the four legs 28, 30, 32, 34 and tail 36, is briskly pulled from its mold and placed up-right on a planar glass surface (not shown) and tested as to its capability of standing erect on its legs 28,30,32 and 34. The pair of ears 42, 44 are molded separately or in a single mold, using the same resinous solution.

The soft "rubber dog" 20 is filled with chaff 50, separated from thrashing grain such as the seed covers of rice, barley, buckwheat, and even whole rice, is introduced into the "rubber dog" 20 through the entry opening 38 filling same as a packing, to shape the "rubber dog" 20 into the configuration of the replica dog. The entry opening 38 is covered to prevent the escape of the chaff 50.

When the soft head 22 is briskly pulled from its mold, it is permitted to stand upright, and then is filled with chaff 50 so that it is formed into its final shape, ready to be implanted with the wool yarn lengths 58,60, in the same process as will be described with respect to the implantation of the wool yarn lengths 58.60 to the interior of the chaff-filled soft "rubber dog" 20 shown in FIG. 2. Prior to the implantation of the wool yarn lengths 58, 60 to the soft dog head 22, the desired face 23 of the dog head 22 is completed by hand painting the eyes 22' and the snout 22" including the nose 22(a) and the mouth line 22(b) of the dog head 22, forming a copper mask (not shown) on the dog face and spraying the desired color paint on the face, including on the snout and mouth portion of the face and the mouth portion thereof The selected color of the eyes 22' then is spray painted on the eye and eye ball locations. The nose 22(a) also is spray painted with a suitable color. The painted locations are permitted to dry. The colors may be variegated at the request of a client.

In FIG. 3, the adjustable needle holder 52 for the crochet needle 54 is illustrated. showing the crochet needle 54 mounted therein with the hook portion 56 at the free end thereof.

The wool yarn is cut into groups of selected length the number depending upon the particular replica of the pet animal being formed. For the particular embodiment of the pet mannequin being described as being herein, bundles of approximately 10 cm, (5 inch) length 58 and 12 cm (6 inch) length 60 are formed. Starting with the 10 cm. (5 inch) lengths 58 of the wool yarn, a length 58 of the 10 cm (5 inch) lengths 58 of wool yarn is successively hooked on the hook 56 of the crochet needle 54 and the thus loaded crochet needle 54 with the 10 cm, (5 inch) length 58 of wool yarn attached to the hook 56 thereof is forced through the soft legs of the soft "rubber dog" at locations one proximate the other, encircling each leg and then respectively withdrawing the crochet needle 54, leaving the wool yarn ends within the respective leg of the soft "rubber dog". The inside leg is first to be implanted with the wool yarn length 58 along the inside leg, downside first and encircling the leg. The outside legs are next to be implanted with the 10 cm (5 inch) lengths of wool yarn. Implantation of the wool yarn lengths in the down side of the legs is the most difficult area to insert the loaded crochet needle 54.

Using the crochet needle 54 illustrated in FIG. 3, each 12 cm. (6 inch) length 60 of wool yarn is hooked on the hook 56 of crochet needle 54. The implantation of the body of the "rubber dog" now will proceed. With the needle 54 with the 12 cm. (6 inch) wool yarn length 60 attached to the hook 56 of the crochet needle 54, starting adjacent with the left outside leg of the soft "rubber dog" 20, the crochet needle 54 with the 12 cm (6 inch) length 60 of wool yarn attached to the hook 56 thereof, then is forced through the wall of the body of the soft "rubber dog" 20 carrying the length 60 of wool yarn into the interior of the body of the "rubber dog" and the crochet needle 54 is withdrawn, leaving the end of the length 60 of wool yarn within the interior of the "rubber dog" 20. This operation is repeated, each with an individual length 60 of wool yarn, in the order of the right outside side, the back next, continuing with the left side, the right side and the neck of the soft "rubber dog" so that a wool yarn density is selected to be 116–120 cm. (33–36 per square inch) with the direction of implantation being natural for the breed of replica dog being formed.

The soft head 22, filled with chaff, of the "rubber dog" 20 is next to be implanted with the 12 cm.(6 inch) lengths 60. The wool yarn 12 cm.(6 inch) lengths 60 are implanted evenly and in the correct direction. Each length 60 of wool yarn is implanted in close proximity, one length to the other, thereby embedding each length 60 of wool yarn in the interior wall of the head 22 of the "rubber dog" when the loaded needle 54 is withdrawn therefrom. Thereafter, the chaff 50 within both the "rubber dog" 20 and the head 22 is emptied from the interior of the soft "rubber dog" 20 and the head 22 leaving the implanted ends of the wool yarn lengths 58 and 60 within the interior of the "rubber dog" 20 and the head 22 thereof.

Wool yarn lengths 58 or 60 also are applied to the tail 36, using the crochet needle 54, but not in the same manner as the other portions of the "rubber dog". The selected implanted wool yarn lengths 58 or 60 for the tail 36 are torn apart, brushed and are sewn on a cloth (not shown) and are tangled clockwise and sewn tightly on the tail 36. A small quantity of cyanoacrylate adhesive, "502", manufactured by Beijing Chemical Works of Beijing, Peoples Republic of China, is applied to the sewed tail 36.

Figure 5:
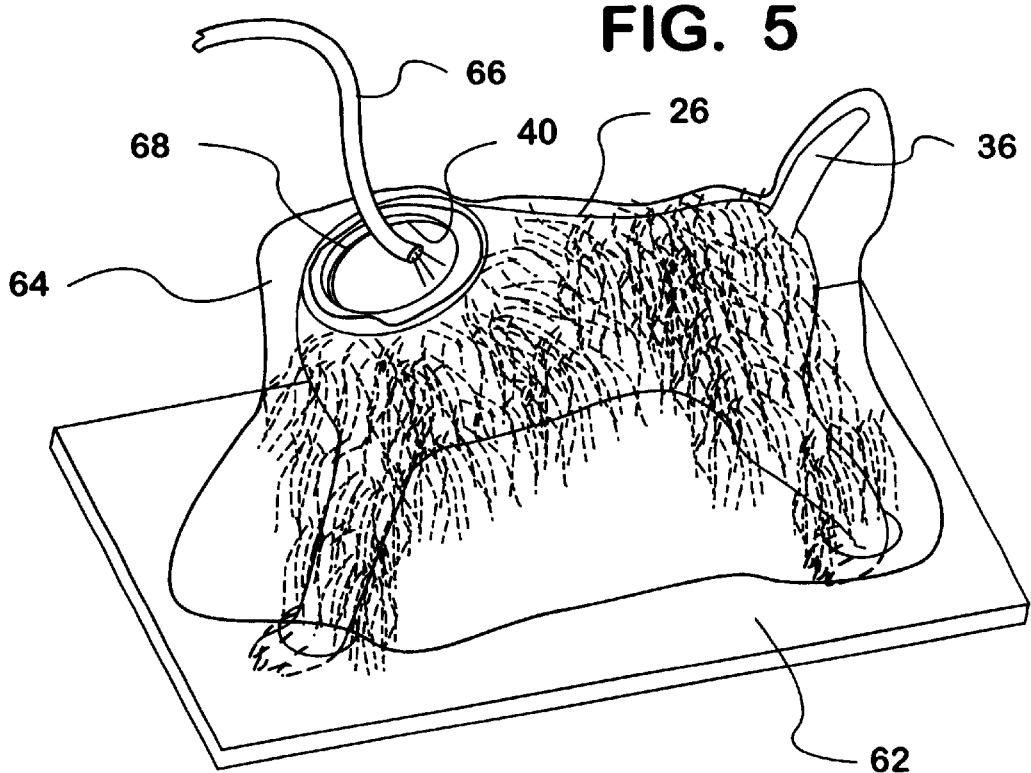
FIG. 5 is an illustration of the injection of a pre-mixed self-expansible resinous adhesive solution into the torso of the hollow soft "rubber dog" body subsequent to the complete implantation of the hair-simulating wool yarn therein, the "rubber dog" body being shown standing upon a flat wooden board and covered with a thin flexible plastic protective sheet, the injection hose from the source of the pre-mixed self-expansible resinous adhesive solution being shown in the process of injecting the pre-mixed self-expansible resinous adhesive solution into the torso of the "rubber dog" body through the entrance opening thereof.
Figure 6:
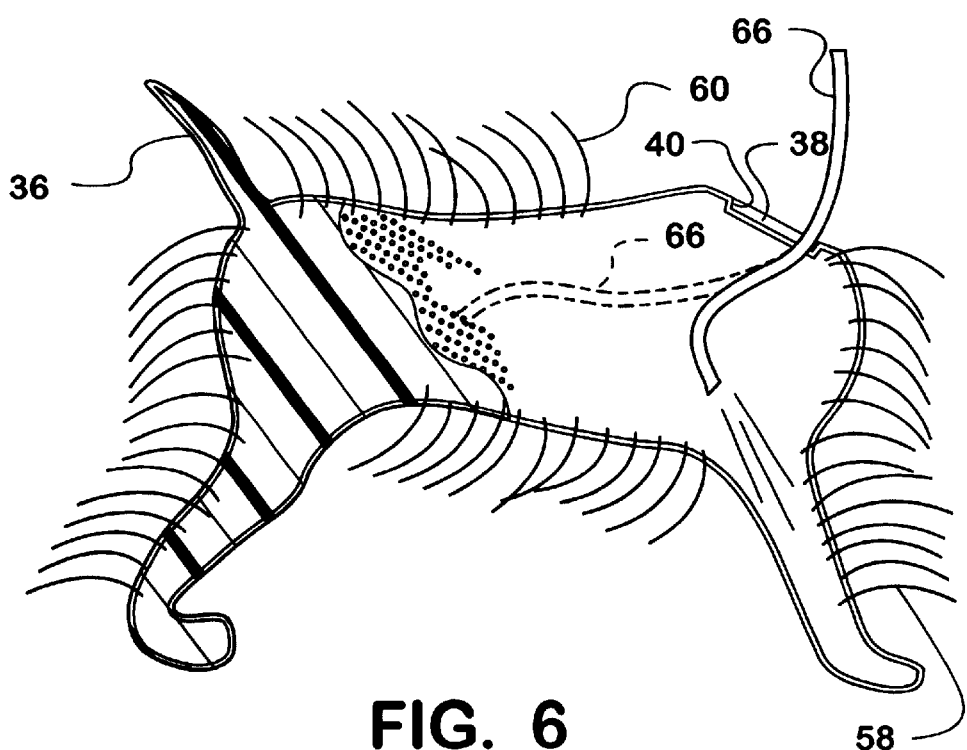
FIG. 6 is a vertical sectional view of the "rubber dog" body illustrating the injection of the pre-mixed self-expansible resinous adhesive solution into the interior of the leg of the "soft-rubber dog" body, the said pre-mixed self-expansible resinous adhesive solution being directed from the injection hose into the interior of the leg thereof, and, the implanted coated portions of the implanted hair-simulating wool yarn being represented as permanently fixed inside the wall of the "soft-rubber dog" by the said pre-mixed self-expansible resinous adhesive solution from the injection hose shown in phantom representation.

With the completion of the implanting of the wool yarn lengths into the "rubber dog" 20 and the head portion 22, the "rubber dog" 20 is mounted upon a planar wooden plank 62, as shown in FIG. 5. A flexible cover sheet 64 is draped over the "rubber dog" as a protective covering. The pre-mixed self-expansible heated mixture of liquid polyvinyl chloride resin, (a polyol white resin), and a polymeric isocyanate black resin had been prepared as a foaming "bubble" solution. The polyol material can raise bubbles within a few seconds during injection and is directed from a mixing tank (not shown) through a feeding tube 66 to fill the spaces interior of the implanted "rubber dog", the black resin component serving to control and steady the bubbles emanating from the polyol. The country of origin for the black polymeric isocyanate is England, The Netherlands and the United States. The country of origin of the "white" resin is China, originating from the KA LIK INDUSTRIAL CO. in the Peoples Republic of China. A plastic collar 68 is introduced into the entry opening 38 of the "rubber dog" 20 and head portion 22, and the pre-mixed self-expansible foaming mixture is injected through feeding tube 66 into the entry opening 38 of the "rubber dog" The mixture of pre-mixed self-expansible foaming polyol and black resin quickly self-expands, filling the interior of the "rubber dog" 20, and the head portion 22, expanding therein to embed the wool yarn lengths permanently fixed to the interior wall of the "rubber dog" 20 and the head portion 22. The self-expansion of the self-expansive foaming adhesive solution will cause the head portion 22 and the rim means 46 of the head portion 22 and the rim means 40 surrounding entry opening 28 will cause the "rubber dog" 20 and the head portion 22 to be permanently coupled together. An excess of said expanded pre-mixed self-expansible self-foaming mixture rises over the plastic collars 68, wooden discs (not shown) being used to close off the expanded pre-mixed self-expansible foaming mixture.

The head portion 22 is filled with the pre-mixed self-expansible foaming mixture and is placed over the entry opening 38 and thereby is secured to the "rubber dog". It takes about 3 to 5 minutes to cool the pre-mixed self-expansible foaming mixture into solid foam.

The wooden platform 62 is used to prevent the pre-mixed self-expansible foaming mixture forcing the legs 28, 30, 32 and 34 to be to be uneven, said four legs being stabilized during the foaming of the "rubber dog", thereby permitting the "rubber dog" to stand erect and stable in upright condition. The wooden platform 62 is provided with four spaced holes (not shown) to receive the legs, whereby to enable the liquid foaming mixture into the legs. The wooden platform 62 is only used during the introduction of the pre-mixed self-expansible foaming mixture to the interior of the four legs of the "rubber dog". The plastic collars 68 are permitted to remain in place.

The addition of the pre-mixed self-expansible foaming mixture further results in the hardening of the soft "rubber dog" 20. Now the presently exterior portions of wool yarn lengths 58, 60 which are twisted, plied strands, are literally torn apart and separated into three or four thin strands. These are separated by careful brushing from upper to lower and outer to inner preferably using a wire brush and comb (not shown) to form longitudinal filaments amounting to a massive multiple plurality of thin, light, flat, elongate silk-like blades over the whole body of the now rigid replica of the selected breed of dog. The wire-pin brush and comb (not shown) are the conventional tools used and the tools that are utilized to provide the dog mannequin which is particularly useful in training the professional dog trimmer.

In summary, the present invention provides a manufacturing method for forming a pet mannequin, here, a dog mannequin, comprising the steps of molding the body of the dog mannequin with a soft resin, introducing chaff into the soft body to fix the form, inserting wool yarn lengths into the soft body, hardening the soft body and fixing the wool yarn lengths from the inside of the body with an self-expansive adhesive to arrange it into the shape of the selected pet, here the dog, thereby enabling the provision, here, of a dog mannequin which is capable of use in the teaching and training of shape arranging such as carried out in teaching and training a trainee aimed at a professional trimmer.

The dog mannequin is useful as a practicing bed for shearing hair of the pet by an expert called trimmer whose occupation is to shear hair of a pet such as a dog to arrange its shape, or a trainee aimed at becoming a trimmer.

I claim:

1. A method for manufacturing a dog mannequin model for use in practicing trimming in which body hair is applied to the dog mannequin comprising the steps of:
   a) separately forming by molding a hollow soft walled body portion having a torso including a trunk portion, leg portions and tail shaping same, a hollow head portion, and a pair of ear portions adapted to be coupled to said head portion, said hollow soft walled body portion having an entry opening;
   b) packing chaff into the torso, trunk, leg portions and head portion filling same;
   c) implanting body hair-simulating wool yarn lengths having a fixed size into the interior wall of said hollow soft walled body portion including said torso, trunk, leg portions and head portion;
   d) removing said chaff from said hair-simulating wool yarn lengths implanted interior wall of said hollow soft-walled body portion and said head portion;
   e) injecting a hot charge of a pre-mixed self-expansible adhesive solution into said chaff-free torso, trunk and leg portions and said head portion; and,
   f) permitting the self-expansion of said injected charge whereby permanently fixedly to to adhere said implanted hair-simulating wool yarn lengths interior of said soft-walled body portion and said head portion; and,
   g) assembling said implanted body and head portions.

2. The method according to claim 1 in which said hot charge within the implanted soft-body portion and head portion is permitted to harden after the self-expansion of said injected hot charge within said chaff-free torso, trunk and leg portions of said soft-walled body and said head portion.

3. The method according to claim 1 in which said soft body portions and said head portion are molded from a synthetic polyvinyl chloride resin.

4. The method according to claim 1 in which said hot charge comprises a pre-mixed mixture of a liquid polyvinyl chloride resin, a black polymeric isocyanate resin and a white polyol resin.

5. The method according to claim 1 in which said molding is effected for 8 minutes at a temperature between 270 and 300 degrees Fahrenheit.

6. The method according to claim 1 in which said molding solution comprises polyvinyl chloride resin, an oil, a heat resistance solution and a stabilizing solution.

7. The method according to claim 1 in which said chaff comprises at least one of the separated product of threshing grain, grain rice, barley, the seed covering of grain, of cereal, of rice, of barley, buckwheat and whole rice.

8. The method according to claim 1 in which the hair-simulating wool yarn lengths extending outward from said implanted portions thereof are torn to separate the individual strands thereof and are brushed to develop thin, silk-like longitudinal filaments.

9. The method according to claim 1 in which the density of wool yarn lengths implanted is 33 to 36 wool yarn lengths per square inch.

10. The method according to claim 1 in which collars are inserted in the entry opening in the body portion prior to the introduction of said pre-mixed self-expansible adhesive solution and said expanding pre-mixed self-expansible solution rises above said collars, the expanded excess thereof is cut off.

11. The method according to claim 1 in which said wool yarn lengths are sewn to a cloth, then torn and brushed to form longitudinal filaments, said cloth being sewn on the tail of said body portion.

12. The method according to claim 1 in which said wool lengths exterior of said body portion and head portion are torn and brushed to form longitudinal filaments into silky yards.

13. The method according to claim 1 in which said body portion is seated upright on a wooden board having holes located to receive the empty legs of said soft walled body portion during the introduction of said pre-mixed expansible adhesive solution into said empty legs in sufficient quantity to assure embedment of said hair-simulating wool yarn lengths therein.

14. The method according to claim 1 in which said wool yarn is cut into plural lengths of 5 inches and of 6 inches, selected ones of said lengths being selected for implantation into said respective body and head portions.

* * * * *